(12) United States Patent
Donovan et al.

(10) Patent No.: US 10,913,206 B2
(45) Date of Patent: Feb. 9, 2021

(54) SYSTEMS AND METHODS FOR POST ADDITIVE MANUFACTURING PROCESSING

(71) Applicant: Delavan Inc, West Des Moines, IA (US)

(72) Inventors: Matthew Donovan, Ankeny, IA (US); Thomas J. Ocken, Des Moines, IA (US); Joseph Samo, Johnston, IA (US)

(73) Assignee: DELAVAN, INC, West Des Moines, IA (US)

( * ) Notice: Subject to any disclaimer, the term of this patent is extended or adjusted under 35 U.S.C. 154(b) by 543 days.

(21) Appl. No.: 14/816,528

(22) Filed: Aug. 3, 2015

(65) Prior Publication Data

US 2017/0036401 A1 Feb. 9, 2017

(51) Int. Cl.
| | | |
|---|---|---|
| *B29C 64/35* | (2017.01) | |
| *B29C 64/153* | (2017.01) | |
| *B29C 64/165* | (2017.01) | |
| *B33Y 40/00* | (2020.01) | |
| *B08B 7/02* | (2006.01) | |
| *B29C 64/357* | (2017.01) | |
| *B29C 71/00* | (2006.01) | |
| *B22F 3/105* | (2006.01) | |

(52) U.S. Cl.
CPC .............. *B29C 64/35* (2017.08); *B08B 7/028* (2013.01); *B29C 64/153* (2017.08); *B29C 64/165* (2017.08); *B29C 64/357* (2017.08); *B33Y 40/00* (2014.12); *B22F 2003/1059* (2013.01); *B29C 71/00* (2013.01)

(58) Field of Classification Search
None
See application file for complete search history.

(56) References Cited

U.S. PATENT DOCUMENTS 4,124,411 A * 11/1978 Meuleman .............. C30B 11/10
117/81
4,752,352 A * 6/1988 Feygin ................. B23K 26/083
156/154

(Continued)

FOREIGN PATENT DOCUMENTS

| JP | 2003225948 | * | 8/2013 |
| WO | WO 2016148332 | * | 2/2017 |

OTHER PUBLICATIONS

Robotmag, Robot Magazine—Crustcrawler AX-12 Smart Arm Pouring a Drink, Published Jul. 7, 2011, retrieved Jan. 6, 2019, <https://www.youtube.com/watch?v=cQe3wMVykyo> ("Smart Arm Pouring a Drink"). (Year: 2011).*

(Continued)

*Primary Examiner* — Joseph S Del Sole
*Assistant Examiner* — Manley L Cummins, IV
(74) *Attorney, Agent, or Firm* — Locke Lord LLP; Daniel J. Fiorello; Scott D. Wofsy

(57) ABSTRACT

A system for removing powder from an additively manufactured article includes a powder removal mechanism. The powder removal mechanism can include a build plate holder configured to hold a build plate at a distal end thereof. The powder removal mechanism can also include a first actuator that is configured to angle the build plate holder relative to gravity and a second actuator that is configured to rotate the build plate holder about a central axis of the build plate holder.

14 Claims, 4 Drawing Sheets

(56) References Cited

U.S. PATENT DOCUMENTS

| | | | |
|---|---|---|---|
| 5,658,520 A * | 8/1997 | Hards | B29C 41/02 264/279.1 |
| 7,296,599 B2 | 11/2007 | Cox | |
| 7,464,733 B2 | 12/2008 | Cox | |
| 7,887,316 B2 | 2/2011 | Cox | |
| 2001/0045678 A1* | 11/2001 | Kubo | B29C 41/36 264/37.29 |
| 2002/0090410 A1* | 7/2002 | Tochimoto | B29C 64/165 425/215 |
| 2004/0045941 A1* | 3/2004 | Herzog | B23K 26/02 219/121.6 |
| 2005/0173380 A1* | 8/2005 | Carbone | B23K 26/32 219/121.31 |
| 2009/0283119 A1* | 11/2009 | Moussa | B08B 3/02 134/57 R |
| 2011/0296944 A1* | 12/2011 | Carter | B25J 17/0275 74/490.05 |
| 2013/0052291 A1* | 2/2013 | Morikawa | B29C 67/0077 425/135 |
| 2013/0171431 A1* | 7/2013 | Swartz | B32B 37/1284 428/196 |
| 2013/0186514 A1* | 7/2013 | Zhuang | B22F 1/0003 141/11 |
| 2015/0266211 A1* | 9/2015 | Wolfgang | B33Y 40/00 264/69 |
| 2016/0136759 A1* | 5/2016 | Broda | B22F 3/1055 219/76.1 |
| 2016/0193658 A1* | 7/2016 | Miyasaka | B22F 1/0085 451/38 |
| 2016/0236422 A1* | 8/2016 | Sakura | B29C 67/0077 |
| 2016/0279871 A1* | 9/2016 | Heugel | B22F 3/1055 |
| 2016/0288415 A1* | 10/2016 | Fromm | B33Y 10/00 |

OTHER PUBLICATIONS

Search Report under Section 17(5), of the United Kingdom Intellectual Property Office, dated Feb. 8, 2017, in corresponding UK Patent Application No. GB1613216.9.

* cited by examiner

SYSTEMS AND METHODS FOR POST ADDITIVE MANUFACTURING PROCESSING

BACKGROUND

1. Field

The present disclosure relates to additive manufacturing, more specifically to post additive manufacturing processing.

2. Description of Related Art

Traditionally, removing metal powder from additive manufacturing build structures can be a challenge. The build structure often needs to be tilted at various angles, and agitated mechanically or by other means to facilitate powder removal. This process is tedious and time consuming, as well as prone to numerous environmental health and safety issues.

Such conventional methods and systems have generally been considered satisfactory for their intended purpose. However, there is still a need in the art for systems for improved systems and methods for post additive manufacturing processing. The present disclosure provides a solution for this need.

SUMMARY

A system for removing powder from an additively manufactured article includes a powder removal mechanism. The powder removal mechanism can include a build plate holder configured to hold a build plate at a distal end thereof. The powder removal mechanism can also include a first actuator that is configured to angle the build plate holder relative to gravity and a second actuator that is configured to rotate the build plate holder about a central axis of the build plate holder.

The powder removal mechanism can include a vibration device mounted to the build plate holder and/or any other suitable portion (e.g., the build plate or build structure) to vibrate the build plate holder to facilitate powder removal. In certain embodiments, the vibration device can include an ultrasonic transducer or any other suitable transducer.

The first actuator can include a piston actuator hingedly mounted to the build plate holder such that extension of the piston actuator angles the build plate holder relative to gravity. In such an embodiment, the build plate can be hinged to a plate that is fixed to a stationary portion of the piston actuator or to any other suitable fixed structure.

The first actuator can angle the build plate holder between about 0 degrees and about 90 degrees relative to gravity. Any other suitable angle or range of angles is contemplated herein.

The second actuator can include a belt drive motor disposed on the build plate holder off center from the central axis. The belt drive motor can be operatively connected to a rotatable portion of the build plate holder via a belt.

In certain embodiments, the system can include an air flow system configured to route pressurized air to the build plate holder to facilitate powder removal.

The system can also include an enclosure configured to retain a removed powder, wherein the powder removal mechanism is mounted within the enclosure. The system can further include a powder recovery system for recycling the removed powder. The powder recovery system can include a vacuum operatively connected to the enclosure to evacuate the removed powder.

The system can further include a control system operatively connected to the powder removal mechanism to position and/or vibrate the build plate holder. The control system can be configured to receive an input of a part type.

The control system can include a part correlation module to move the build plate holder in accordance with at least one predetermined movement based on the input part type. The at least one predetermined movement can include at least one of a predetermined position, a predetermined movement direction, or a predetermined movement rate.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
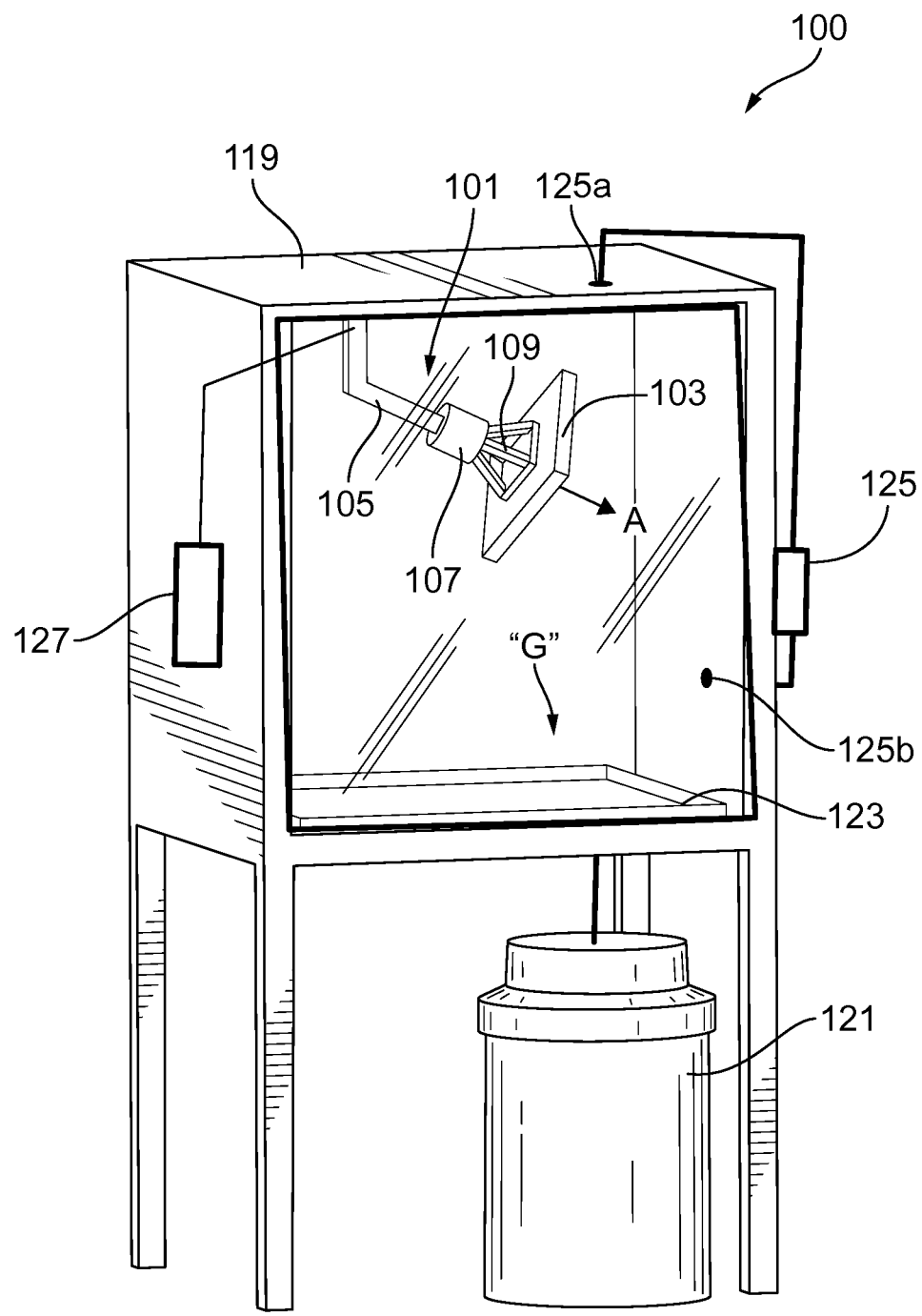
FIG. 1 is a perspective view of an embodiment of a system in accordance with this disclosure, showing an embodiment of a powder removal mechanism mounted in an enclosure.
Figure 2A:
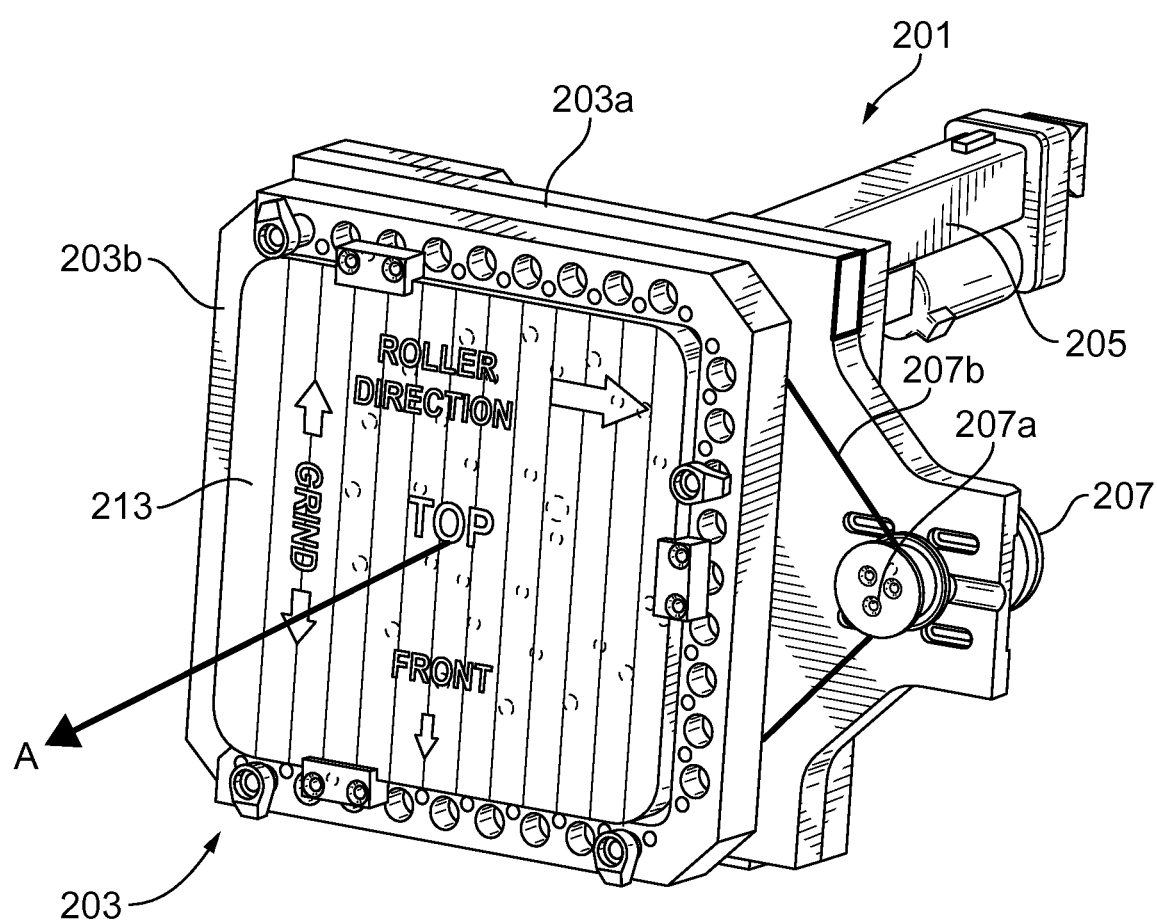
FIG. 2A is a perspective view of an embodiment of a powder removal mechanism in accordance with this disclosure.
Figure 3:
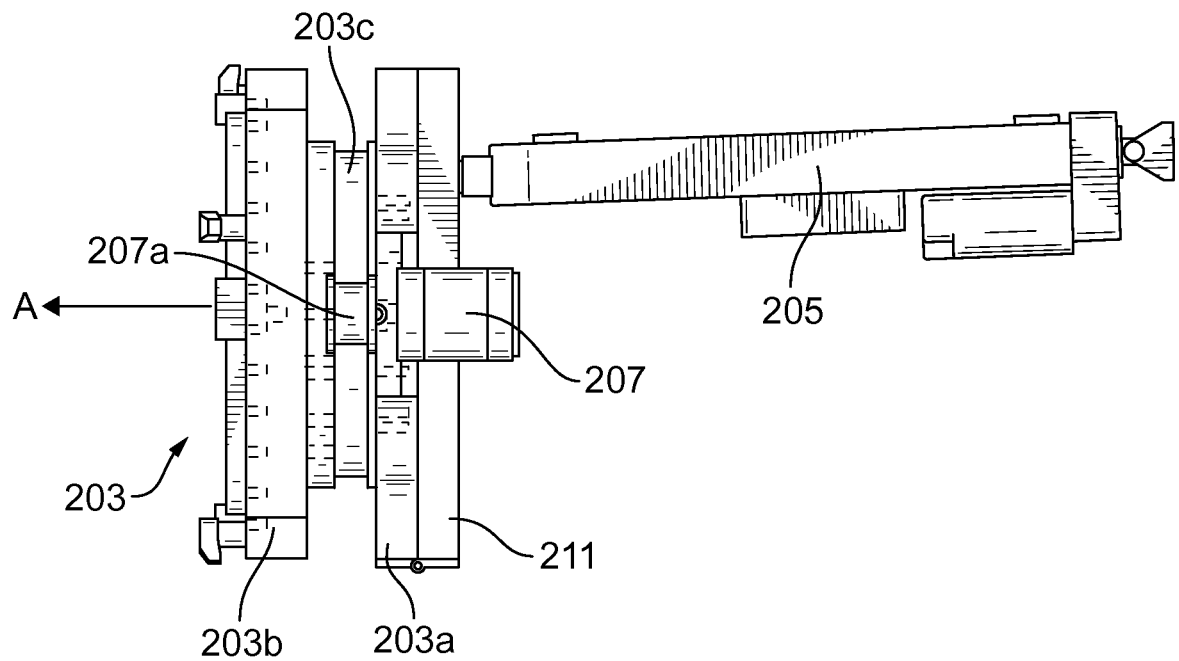
FIG. 3 is a side view of the powder removal mechanism of FIG. 2, shown with a first actuator in a retracted position such that the build plate holder is in a substantially vertical position relative to gravity (i.e., central axis A is perpendicular to the direction of gravity)
Figure 4:
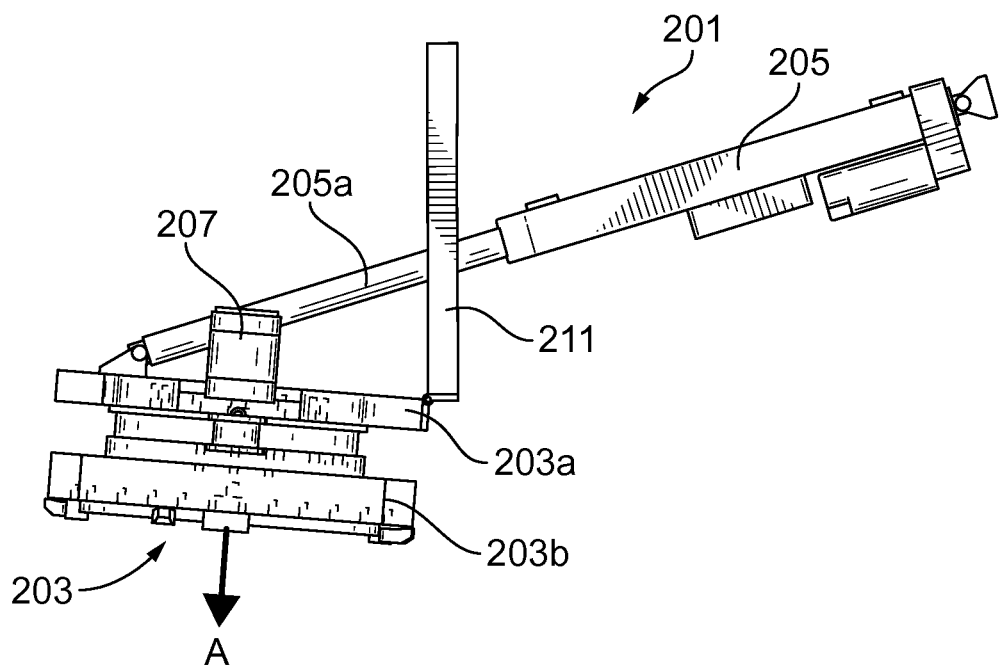
FIG. 4 is a side view of the powder removal mechanism of FIG. 2, shown with the first actuator in a deployed position such that the build plate holder is facing downward toward a direction of gravity (i.e., central axis A is has a component in the direction of gravity).

Reference will now be made to the drawings wherein like reference numerals identify similar structural features or aspects of the subject disclosure. For purposes of explanation and illustration, and not limitation, an illustrative view of an embodiment of a system in accordance with the disclosure is shown in FIG. 1 and is designated generally by reference character 100. Other embodiments and/or aspects of this disclosure are shown in FIGS. 2-4. The systems and methods described herein can be used to remove powder from additively manufactured articles.

Referring to FIG. 1, a system 100 for removing powder from an additively manufactured article (e.g., a turbomachine component with complex inner channels) includes a powder removal mechanism 101. The powder removal mechanism 101 can include a build plate holder 103 configured to hold a build plate at a distal end thereof.

The powder removal mechanism 101 can also include a first actuator 105 that is configured to angle the build plate holder 103 relative to gravity (e.g., central axis A is moved relative to gravity). The second actuator 107 can be configured to rotate the build plate holder 103 about a central axis A of the build plate holder 103.

In certain embodiments, the first actuator 105 can angle the build plate holder 103 between about 0 degrees and about 90 degrees relative to gravity. Any other suitable angle or range of angles is contemplated herein, e.g., between about 0 degrees and about 180 degrees.

The powder removal mechanism can include a vibration device 109 mounted to the build plate holder 103 to vibrate the build plate holder 103 to facilitate powder removal. In certain embodiments, the vibration device 109 can include an ultrasonic transducer and/or any other suitable transducer or pneumatic device.

As shown in FIG. 1, the first actuator 105 can be hinged to angle the build plate holder 103 and the second actuator 107 can be coaxially mounted around the first actuator 105 to rotate the build plate holder 103. However, in certain embodiments, referring to FIGS. 2A and 2B, a powder removal mechanism 201 can include a first actuator 205 that includes a piston actuator 205a hingedly mounted to the build plate holder 203 such that extension of the piston actuator 205a angles the build plate holder 203 relative to gravity. In such an embodiment, a portion 203a of the build plate 203 can be hinged to a plate 211 that is fixed (e.g., to a stationary portion of the second actuator 205 or to any other suitable fixed structure).

Referring additionally to FIGS. 3 and 4, the actuation of the piston actuator 205a is shown between a retracted position (FIG. 3) and a deployed position (FIG. 4). As shown, as the piston actuator 205a extends, the portion 203a of the build plate holder 203 is pushed out and hinged relative to plate 211 which changes the direction of central axis A relative to gravity.

The mechanism 200 can include a second actuator 207 (e.g., a belt drive motor) disposed on the build plate holder 103 off center from the central axis A to rotate a rotatable portion 203b of the build plate holder 203. In certain embodiments, the second actuator 207 can be operatively connected to the rotatable portion 203b of the build plate holder 203 via a belt 207b. For example, the belt 207b can connect the belt drive motor 207 to the rotatable portion 203b of the build plate via motor wheel 207a and belt wheel 203c which rotatably mounts the rotatable portion 203b of the build plate holder 203 to the portion 203a of the build plate.

Figure 2B:
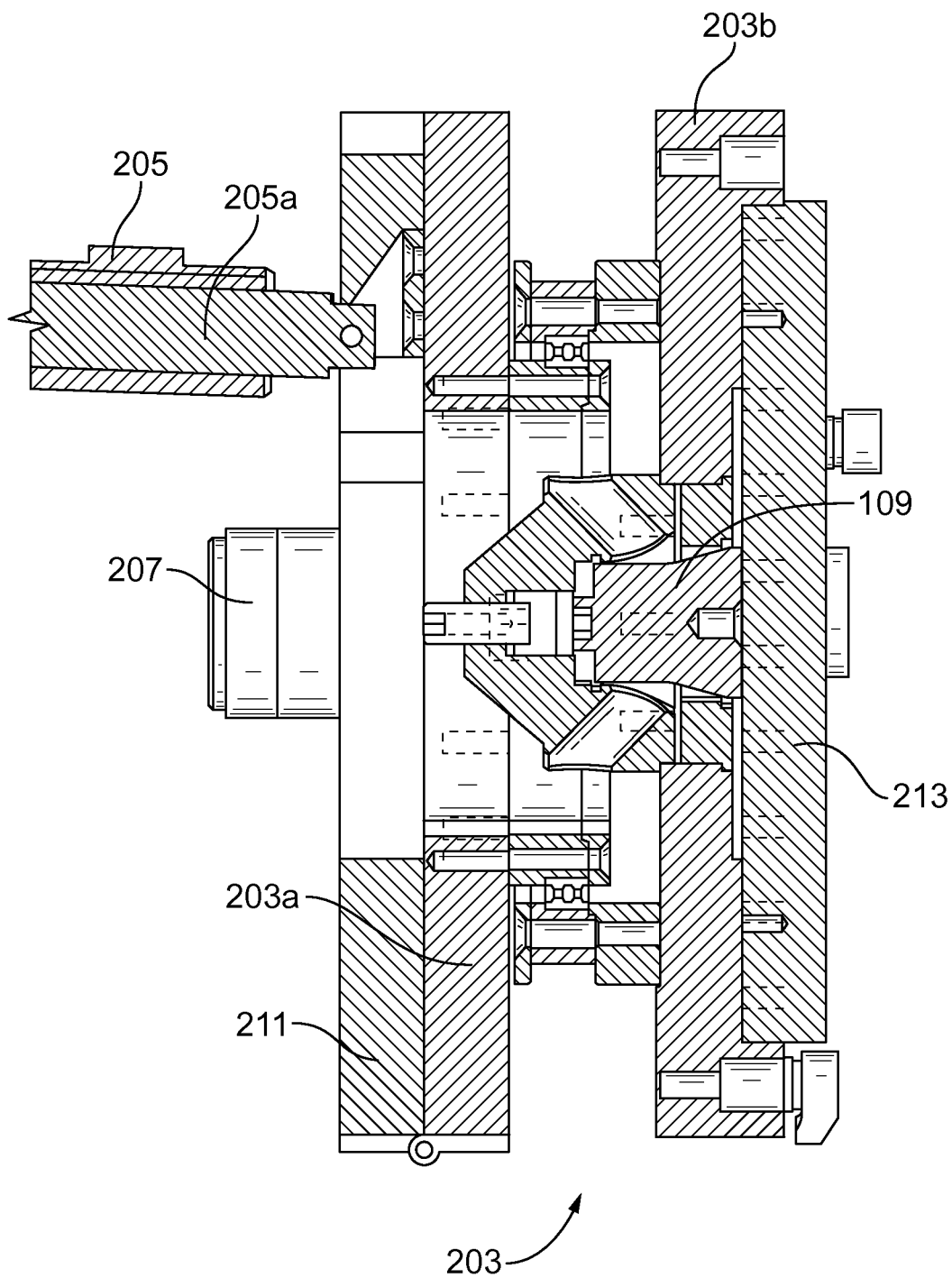
FIG. 2B is a cross-sectional elevation view of the powder removal mechanism of FIG. 2A

Referring to FIG. 2B, the vibration device 109 can be mounted to the rotatable portion 203b of the build plate holder 203 or in any suitable location (e.g., on portion 203a, on the first actuator 205). In certain embodiments, as shown, the vibration device 105 can be mounted on a rear side of an indexing plate 213.

Referring again to FIG. 1, the system 100 can also include an enclosure 119 configured to retain a removed powder. The powder removal mechanism 101 can be mounted within the enclosure 119. However, it is contemplated that the powder removal mechanism 101 may not be mounted within the enclosure 119 and can be mounted in any suitable location (e.g., a ceiling or wall in a manufacturing shop).

The system 100 can further include a powder recovery system for recycling the removed powder. The powder recovery system can include a vacuum 121 operatively connected to the enclosure 119 to evacuate the removed powder (e.g., from catch tray 123).

In certain embodiments, the system 100 can include an air flow system 125 configured to route pressurized air to the build plate holder 103 to facilitate powder removal. The air flow system 125 can include an inlet 125a and an outlet 125b disposed in any suitable portion of the enclosure 119 to route pressurized air flow to the build plate holder 103. The air flow system 125 can include any suitable pump or source of pressurized air (e.g., a gas source, vacuum 121).

The system 100 can further include a control system 127 operatively connected to the powder removal mechanism 101 to position and/or vibrate the build plate holder 103 using the first actuator 107 and/or second actuator 107. The control system 107 can be configured to receive an input of a part type (e.g., a turbomachine airfoil model). The control system 127 can be configured to execute a suitable powder removal sequence.

The control system 107 can include a part correlation module to move the build plate holder 103 in accordance with at least one predetermined movement (e.g., in a Cartesian X, Y, Z, and/or rotational direction) based on the input part type. The at least one predetermined movement can include at least one of a predetermined position, a predetermined movement direction, or a predetermined movement rate.

For example, if a user inputs that the part type is a turbomachine component having one or more complex interior passages, the control system 107 can automatically rotate and position the build plate holder 103 to one or more optimal positions at one or more predetermined speeds to facilitate powder removal. The control system 107 may also be connected to the air flow system to provide pressurize air to the part that is mounted to the build plate holder 103. It is also contemplated that the control system 107 can be connected to the vibration device 109 to selectively vibrate the build plate holder 103 in any suitable manner.

The devices and systems as described above allow for a build plate to be placed on the build plate holder 103 after a part is manufactured on the build plate. The build plate holder 103 can then move to one or more positions to allow one or more of gravity, vibration, or pressurized air to coax out any powder within the manufactured part. This can allow for faster post processing as well as batch post processing.

The methods and systems of the present disclosure, as described above and shown in the drawings, provide for powder removal systems with superior properties including fast post processing. While the apparatus and methods of the subject disclosure have been shown and described with reference to embodiments, those skilled in the art will readily appreciate that changes and/or modifications may be made thereto without departing from the spirit and scope of the subject disclosure.

What is claimed is:

1. A system for removing powder from an additively manufactured article, comprising:
   a powder removal mechanism, including:
      a build plate holder configured to hold a build plate on a mounting side of the build plate when the build plate has the additively manufactured article attached thereto on a build side of the build plate, the build plate placed at a distal end of the build plate holder after the article is manufactured on the build side of the build plate such that gravity is allowed to coax out powder within the additively manufactured article;
      a first actuator configured to angle the build plate holder relative to the force of gravity to hold the build plate having the additively manufactured article at least partially upside down such that powder can be coaxed out; and
      a second actuator attached to the build plate holder configured to rotate the build plate holder about a central axis of the build plate holder, wherein the first actuator includes a piston actuator hingedly mounted to the build plate holder such that extension of the piston actuator angles the build plate holder along with the second actuator relative to the force of gravity, wherein the build plate holder is hinged to a plate that is fixed to a stationary portion of the piston actuator.

2. The system of claim 1, wherein the powder removal mechanism further includes a vibration device mounted to the build plate holder to vibrate the build plate holder to facilitate powder removal.

3. The system of claim 2, wherein the vibration device includes an ultrasonic transducer.

4. The system of claim 1, wherein the first actuator can angle the build plate holder between about 0 degrees and about 90 degrees relative to the force of gravity.

5. The system of claim 1, wherein the second actuator includes a belt drive motor disposed on the build plate holder off center from the central axis, wherein the belt drive motor is configured to be operatively connected to a rotatable portion of the build plate holder via a belt.

6. The system of claim 1, further comprising an air flow system configured to route pressurized air to the build plate holder to facilitate powder removal.

7. The system of claim 1, further including an enclosure configured to retain a removed powder, wherein the powder removal mechanism is mounted within the enclosure.

8. The system of claim 7, further comprising a powder recovery system for recycling the removed powder.

9. The system of claim 8, wherein the powder recovery system includes a vacuum operatively connected to the enclosure to evacuate the removed powder.

10. A powder removal mechanism, comprising:
a build plate holder configured to hold a build plate placed at a distal end thereof after an article is additively manufactured such that gravity is allowed to coax out powder within the additively manufactured article;
a first actuator configured to angle the build plate holder relative to the force of gravity to hold the build plate having the additively manufactured article at least partially upside down such that powder can be coaxed out; and
a second actuator attached to the build plate holder configured to rotate the build plate holder about a central axis of the build plate holder, wherein the first actuator includes a piston actuator hingedly mounted to the build plate holder such that extension of the piston actuator angles the build plate holder along with the second actuator relative to the force of gravity, wherein the build plate holder is hinged to a plate that is fixed to a stationary portion of the piston actuator.

11. The mechanism of claim 10, wherein the powder removal mechanism further includes a vibration device mounted to the build plate holder to vibrate the build plate holder to facilitate powder removal.

12. The mechanism of claim 11, wherein the vibration device includes an ultrasonic transducer.

13. The mechanism of claim 10, further comprising the build plate for additive manufacturing.

14. A system for removing powder from an additively manufactured article, comprising:
a powder removal mechanism, including:
a build plate holder configured to hold a build plate on a mounting side of the build plate when the build plate has the additively manufactured article attached thereto on a build side of the build plate, the build plate placed at a distal end of the build plate holder after the article is manufactured on the build side of the build plate such that gravity is allowed coax out powder within the additively manufactured article;
a first actuator configured to angle the build plate holder relative to the force of gravity to hold the build plate having the additively manufactured article at least partially upside down such that powder can be coaxed out; and
a second actuator attached to the build plate holder configured to rotate the build plate holder about a central axis of the build plate holder, wherein the first actuator includes a piston actuator hingedly mounted to the build plate holder such that extension of the piston actuator angles the build plate holder along with the second actuator relative to the force of gravity, wherein the build plate holder is hinged to a plate that is fixed to a stationary portion of the piston actuator; and
an enclosure configured to retain a removed powder, wherein the powder removal mechanism is mounted to a ceiling of the enclosure.

* * * * *